US010530857B2

(12) United States Patent
Gnech et al.

(10) Patent No.: US 10,530,857 B2
(45) Date of Patent: Jan. 7, 2020

(54) SMART MOUNTING OF STORAGE DEVICES

(71) Applicant: International Business Machines Corporation, Armonk, NY (US)

(72) Inventors: Thomas H. Gnech, Herrenberg (DE); Steffen Koenig, Heidelberg (DE); Oliver Petrik, Stuttgart (DE); Sven Wagner, Tiefenbronn (DE)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 15/410,628

(22) Filed: Jan. 19, 2017

(65) Prior Publication Data

US 2018/0205789 A1    Jul. 19, 2018

(51) Int. Cl.
*H04L 29/08* (2006.01)
(52) U.S. Cl.
CPC ...... *H04L 67/1095* (2013.01); *H04L 67/1097* (2013.01)
(58) Field of Classification Search
None
See application file for complete search history.

(56) References Cited

U.S. PATENT DOCUMENTS

| | | | |
|---|---|---|---|
| 7,032,000 B2 * | 4/2006 | Tripp | G06F 17/30109 707/999.01 |
| 7,115,919 B2 | 10/2006 | Kodama | |
| 7,917,628 B2 * | 3/2011 | Hesselink | H04L 63/0209 709/225 |
| 8,082,230 B1 | 12/2011 | Root | |
| 8,433,735 B2 | 4/2013 | Lacapra | |
| 8,533,295 B2 | 9/2013 | Soltis | |
| 8,677,085 B2 | 3/2014 | Vaghani et al. | |
| 8,856,233 B2 | 10/2014 | Lacapra et al. | |
| 2009/0089781 A1 * | 4/2009 | Shingai | G06F 9/5088 718/1 |

(Continued)

FOREIGN PATENT DOCUMENTS

WO    WO-2017120500 A1 *    7/2017    .............. G06F 11/30

OTHER PUBLICATIONS

Gnech et al., U.S. Appl. No. 16/596,546, filed Oct. 8, 2019.

*Primary Examiner* — Jeffrey R Swearingen
(74) *Attorney, Agent, or Firm* — Zilka-Kotab, P.C.

(57) ABSTRACT

A method for smart mounting of a storage device to a server may be provided. The method comprises providing a first peer-to-peer communication component to a first server a first storage device is controlled by, and providing a second peer-to-peer communication component to a second server a second storage device is controlled by. The method also comprises requesting, by said second server, a mounting of said first storage device of said first server using a direct communication between said first peer-to-peer communication component, and said second peer-to-peer communication component using a peer-to-peer communication protocol between said first and said second peer-to-peer communication component without using a central instance between said first and said second server, and providing mounting information of said first storage device to said second peer-to-peer communication component without using said central instance.

20 Claims, 12 Drawing Sheets

(56) References Cited

U.S. PATENT DOCUMENTS

2009/0271412 A1* 10/2009 Lacapra ............ G06F 17/30206
2010/0333116 A1* 12/2010 Prahlad ............ G06F 17/30082
　　　　　　　　　　　　　　　　　　　　719/328

* cited by examiner

SMART MOUNTING OF STORAGE DEVICES

BACKGROUND

The invention relates generally to a method for mounting of storage, and more specifically, to smart mounting of a storage device to a server. The invention relates further to a system for smart mounting of a storage device to a server, and a computer program product.

Today, it is state-of-the-art having distributed storage systems in an information technology (IT) infrastructure, e.g., cloud computing environments. A plurality of servers may physically use the same storage network, e.g., SAN (storage area network). For security reasons, virtual storage networks (VSN) may be configured over these physical networks. A data transfer between servers in the same VSN may be done according to different ways like, e.g., an NFS (Network File System) server (which may need additional software) or a flash copy of the storage system.

If a file system should be copied to another server, there are different data portions necessary to perform this task in an easy way. The target server typically does 'not know' all needed information about the setup of the source device. Thus, there must be a central management server with information about metadata like, the data source, the data target and the storage configuration in order to coordinate the copying of the file system.

Hence, state-of-the-art operating system environments only support such a centralized management system, which requires repeated translation of source metadata to convert such metadata from one storage context to another component. Such a translation may not always work for all types of contexts. Furthermore, it is an inefficient and error-prone process.

SUMMARY

According to one aspect of the present invention, a method for smart mounting of a storage device to a server may be provided. The method may comprise providing a first peer-to-peer communication component to a first server a first storage device is controlled by, and providing a second peer-to-peer communication component to a second server a second storage device is controlled by. Moreover, the method may comprise requesting, by the second server, a mounting of the first storage device of the first server using a direct communication between said first peer-to-peer communication component and said second peer-to-peer communication component using a peer-to-peer communication protocol between the first and the second peer-to-peer communication component without using a central instance between the first and the second server, and providing mounting information of the first storage device to the second peer-to-peer communication component without using the central instance.

According to another aspect of the present invention, a system for smart mounting of a storage device to a server may be provided. The system may comprise a first peer-to-peer communication component of a first server a storage device is controlled by, and a second peer-to-peer communication component of a second server a second storage device is controlled by. Furthermore, the system may comprise that the second peer-to-peer communication component may be adapted for requesting, by the second server, a mounting of the first storage device of the first server using a direct communication between the first peer-to-peer communication component and the second peer-to-peer communication component using a peer-to-peer communication protocol between the first and the second peer-to-peer communication component without using a central instance between the first and the second server, and that the first peer-to-peer-communication component may be adapted for providing mounting information of the first storage device to the second peer-to-peer communication component without using the central instance.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

BRIEF DESCRIPTION OF THE SEVERAL VIEWS OF THE DRAWINGS

Preferred embodiments of the invention will be described, by way of example only, and with reference to the following drawings.

DETAILED DESCRIPTION

Figure 1A:
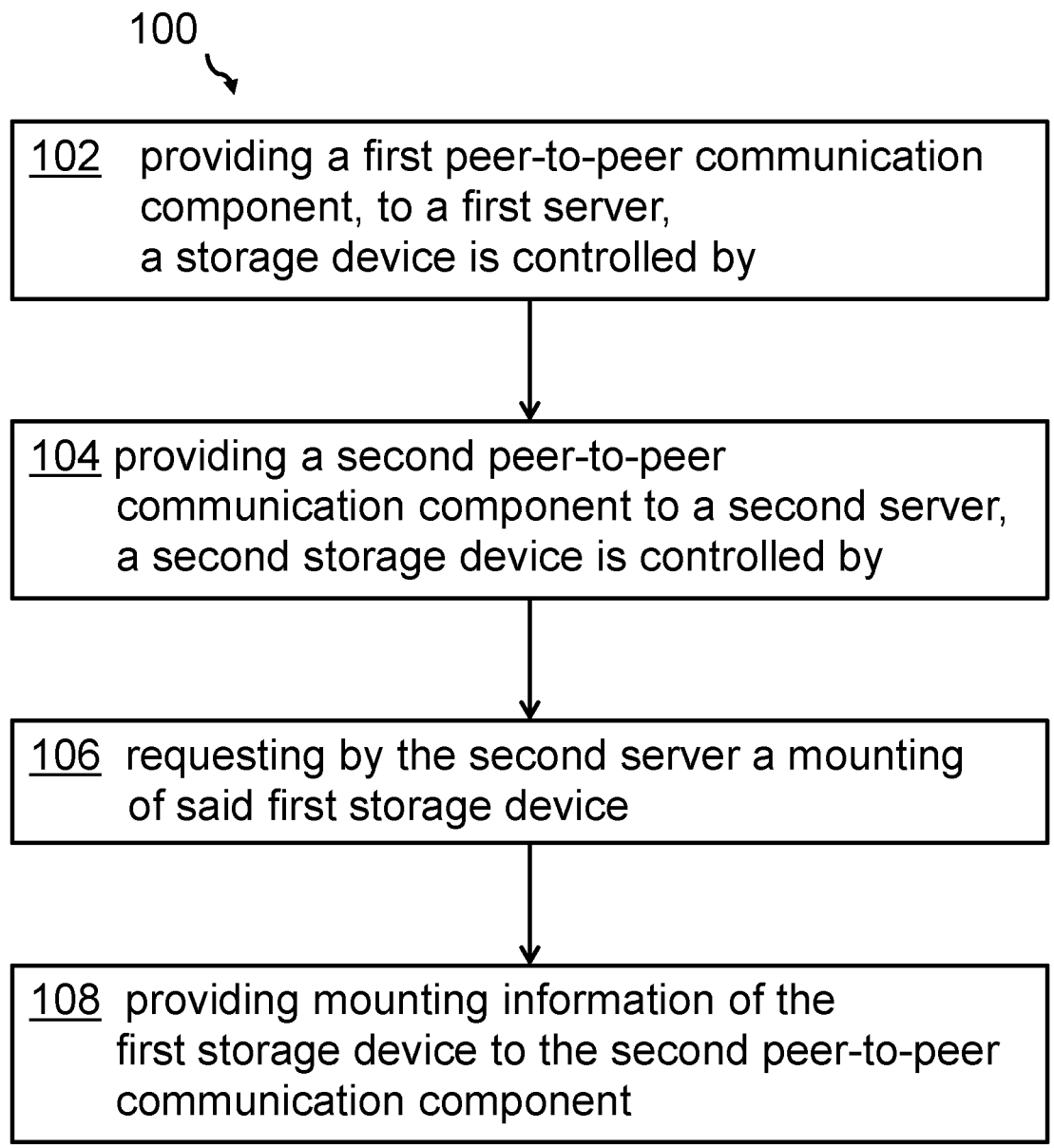
FIG. 1a shows a block diagram of an embodiment of the inventive method for smart mounting of a storage device to a server.

It should be noted that embodiments of the invention are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

In the context of this description, the following conventions, terms and/or expressions may be used:

The term 'smart mounting' may denote in the context of this document a mounting of a storage device to a server that is not actively controlling the storage device via a smart process which includes a peer-to-peer communication between the storage device and another storage device which may be controlled by another server.

The term 'storage device' may denote a device for recording (storing) information (data). The recording may be done using virtually any form of magnetic, electromagnetic, or optical technique. Typically, the storage device may be integrated into the storage system or linked to a storage network. It may comprise monitored disks, flash memory, phase change memory or, any other form of non-volatile storage technique. The storage device that processes information (data storage equipment) may either access a separate portable (removable) recording medium or a permanent component to store and retrieve data. The data on the storage device may be raw data structure data, semi-structured data and/or encoded data.

The term 'peer-to-peer communication component' may denote a function—either implemented as software or as hardware or, as a mixture of both—being adapted to communicate to another component of the same kind. No hierarchical structuring of the communication process may be required. Moreover, no central control may be required to facilitate a communication of two peer-to-peer communication components.

The term 'peer-to-peer communication protocol' may denote a communication protocol implemented and used by the peer-to-peer communication components.

The term 'central instance' may denote a control instance adapted for facilitating a communication between servers and/or storage devices being controlled by a specific server. Such a central instance of central management component may be required to mount a storage device to a server by which it may not be directly controlled.

The term 'mounting information' may denote data of mounting processes of a storage device like, e.g., a server requesting a mount, a path, a copy mode, a date and time of specific actions and so on.

The term 'storage area network' (SAN) may denote a network which may provide access to consolidated, block level data storage. SANs are primarily used to enhance storage devices, such as disk arrays, tape libraries, and optical jukeboxes accessible to servers so that the devices appear to the operating system as locally attached devices. A SAN typically has its own network of storage devices that are generally not accessible through the local area network (LAN) by other devices. Typically, a SAN does not provide file abstraction, but only block-level operations. However, file systems built on top of SANs may provide file-level access, and are known as shared-disk file systems.

The proposed method for smart mounting of a storage device to a server may offer multiple of advantages and technical effects:

The proposed concept may guarantee that cross-accessing storage devices by different servers may no longer dependent on a single, central point of management and thus, central point of failure. This may increase the reliability and ease the handling of the overall mounting process by eliminating metadata conversions and translations. It may only require an enhancement of the storage system with a new management communication component or, peer-to-peer communication component, and may thus simplify the remaining IT infrastructure set.

Additionally, the different options, which may be combined with a non-central approach of smart mounting may allow a wide variety of different implementation and configuration options. Also mixed environments may be deployed, i.e., using—on the one hand side—storage devices equipped with a peer-to-peer communication component—and on the other hand—storage devices without such a component (which may further require a central management component).

According to one preferred embodiment, the method may additionally comprise initiating a copying request by the first or the second server, and starting the copying process at least at one of the first or the second storage device using only the first peer-to-peer communication component and the second peer-to-peer communication component. Hence, no central resource with related overhead may be required. The copying process may be slimmer and may need less system and network resources.

According to a further preferred embodiment of the method, the first storage device and the second storage device may each be connected to a joint storage area network, e.g., the same SAN or VSN.

According to another preferred embodiment of the method, the first storage device and the second storage device may each be part of the same storage system. Thus, the proposed method may also work within the same storage system.

According to one additionally preferred embodiment of the method, the first storage device and the second storage device may each be part of a different storage system using the joint storage area network. Thus, the proposed method may not only work within the same storage system but also span multiple different storage systems. This may advantageously be used in a heterogeneous environment.

According to one advantageous embodiment of the method, a registry data history may be shared among the first and second peer-to-peer communication component. Thus, both sides may have access to the same metadata for cross-wise accessing storage devices. No ad-hoc conversion or translation of any kind may be required.

According to one permissive embodiment, the method may comprise, prior to a mounting of a storage device not controlled by a server, that the server related peer-to-peer communication component may determine whether the server controlling the second storage device may be equipped with a peer-to-peer communication component. Thus, the inventive concept may also be applied to mixed environments in which not all systems are equipped with a peer-2-peer communication component.

According to one optional embodiment of the method, a communication between the first and the second peer-to-peer communication component may use a communication technology based on a protocol provided by the storage area network. This may, e.g., be a fiber channel protocol or the known iSCSI protocol (small computer system interface working on top of the TCP (transport control protocol) of the internet protocol). Hence, a variety of different storage protocols may be used advantageously.

According to an additionally advantageous embodiment of the method, registration data history information of a storage device may be maintained individually per peer-to-peer communication component. Alternatively, the registration data history information of a plurality of storage devices may be maintained jointly in one joint archive. Thus, the inventive concept is transparent for the location for storing registration data history information.

In the following, a detailed description of the figures will be given. All instructions in the figures are schematic. Firstly, a block diagram of an embodiment of the inventive method for smart mounting of a storage device to a server is given. Afterwards, further embodiments, as well as embodiments of the system for smart mounting of a storage device to a server, will be described.

FIG. 1a shows a block diagram of an embodiment of the inventive method 100 for smart mounting of a storage device to a server. The server may either be a hardware system or a virtual server which may be implemented in a distributed server system environment.

The method comprises providing, 102, a first peer-to-peer communication component—which may—in the following—also be denoted as 'distributed cooperation management server' (DCMS), and which may be implementable as software or as a hardware component—to a first server a storage device is controlled by. The server may again be a hardware system or a virtual system.

This method 100 also comprises providing, 104, a second peer-to-peer communication component—which may accordingly also be denoted as second DCMS—to a second server a second storage device is controlled by. Also here it should be clear that the server may be a hardware system or a virtual system.

Furthermore, the method 100 may comprise requesting, 106, by the second server a mounting of the first storage device of the first server using a direct communication between the first peer-to-peer communication component and the second peer-to-peer communication component using a peer-to-peer communication protocol between the first and the second peer-to-peer communication component without using any central instance between the first and the second server, and providing, 108, mounting information of the first storage device to the second peer-to-peer communication component without using the central instance. Thus, the cross-smart-mounting-process may be performed without any central instance. It may be deployed in a truly distributed environment.

Figure 1B:
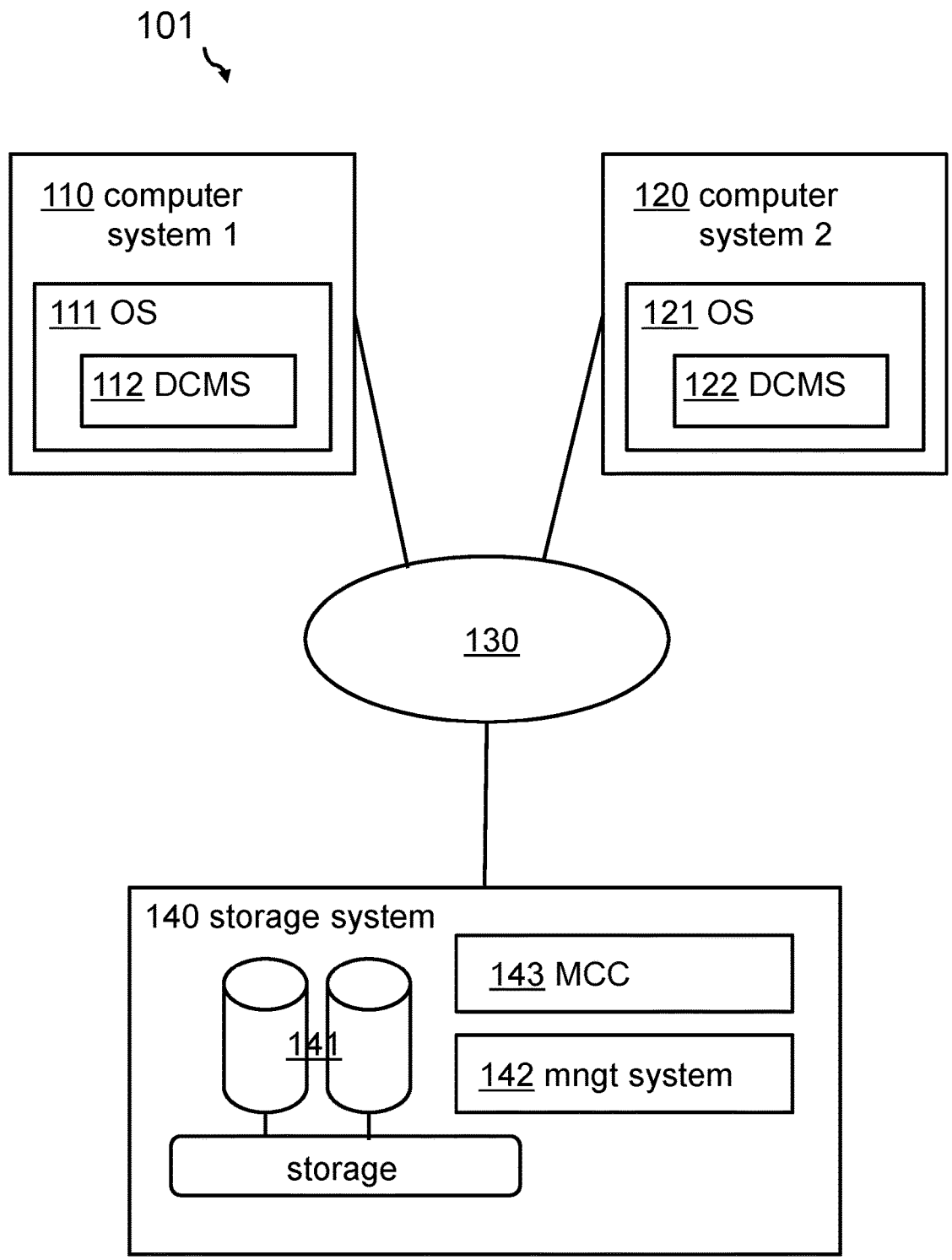
FIG. 1b shows a block diagram of an embodiment of a system overview.

FIG. 1b shows a block diagram of an embodiment 101 of a system overview. A typical system setup implementing the invention consists of a first computer system 110 running operating system 111 and a second computer system 120 running operating system 121. The operating systems 111, 121 may be either generic desktop or server operating systems managing all functional components of the computer systems 110, 120 or a subsystem managing storage and I/O operations of the computer systems 110, 120. Peer-to-peer communication components or Distributed Cooperating Management Server components (DCMS) 112, 122 run under the control of an operating system 111 and 121. In one embodiment, the DCMS 112 and 122 may be generic operation system plug-ins, in another implementation the DCMSs 112, 122 may be native operation system subsystems, and in a further embodiment the DCMSs may be part of a firmware of a storage or I/O subsystem attached to computer systems 110 and 120. Both computer systems 110 and 120 are connected via network 130 to a storage system 140. The storage system 140 comprises physical and virtual storage devices 141 managed by a storage management system 142. An additional Management Communication Component (MCC) 143 enhances the functionality of the storage management system 142 in order to implement the invention. In one embodiment, the MCC 143 may be integrated in the storage device management system 142. In another embodiment, the MCC 143 may be a plug-in for the storage device management system 142 or as a communication proxy between a DCMS on one side and the storage device management system 142 on the other side.

Figure 2:
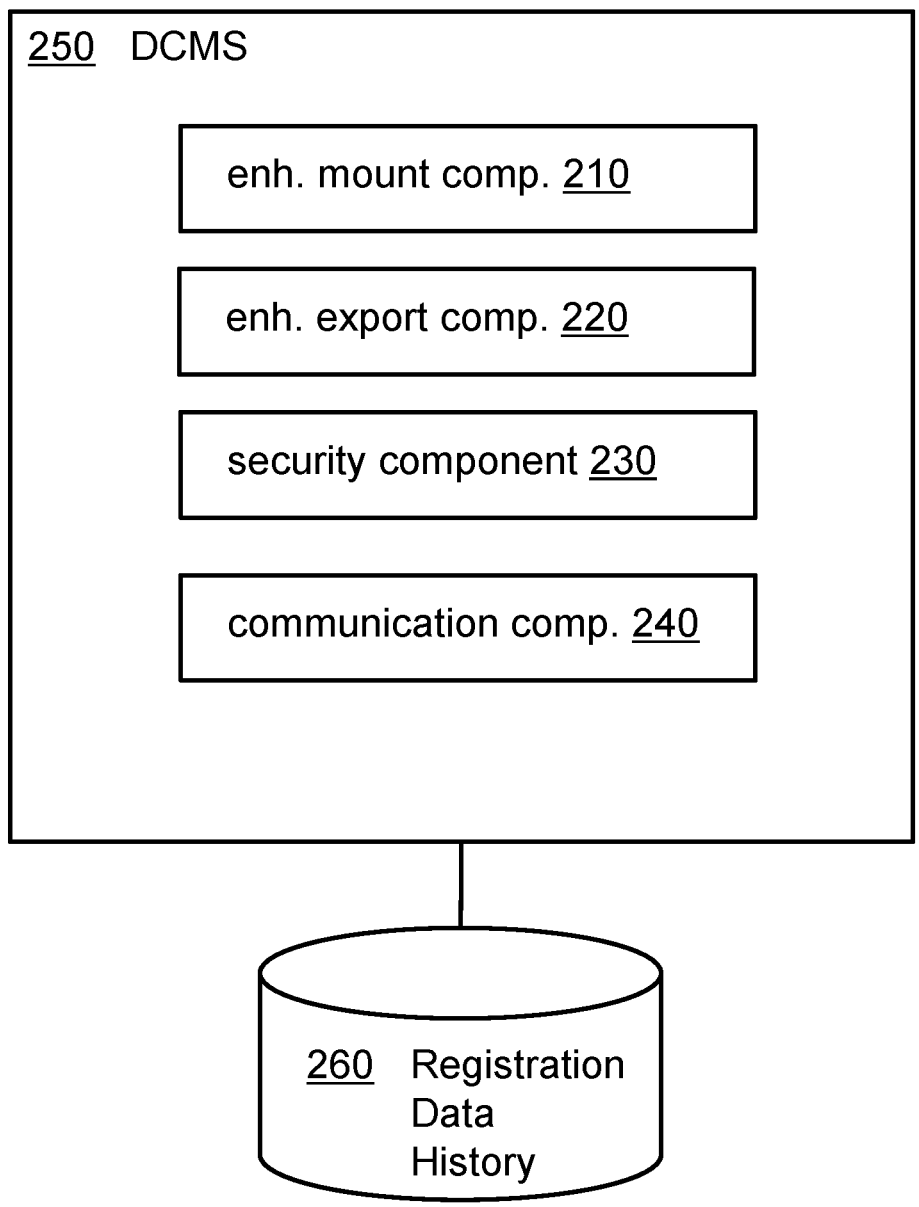
FIG. 2 shows a block diagram of an embodiment of the peer-to-peer communication component.

FIG. 2 shows a block diagram of an embodiment of the peer-to-peer communication component or DCMS 250; in other words, one of the peer-to-peer communication components of FIG. 1b. It comprises an enhanced mount component 210, an enhanced export component 220, a security component 230, a communication component 240 and RDH (registry data history) data store 260. The enhanced mount component 210 handles all requests regarding mounts, e.g., mount/unmount operation, and the enhanced export component 220 all requests regarding exports, e.g. enable/disable an export. Both enhanced components 210, 220 use the security component 230. The security component 230 ensures—amongst others—that a certain security level is obtained, network restriction or authorization is satisfied. The communication component 240 handles all communication aspects between DCMSs and MCCs using the storage network by extending the storage network protocol. In another embodiment, the communication can also be established using a non-storage network, e.g., a TCP/IP based protocol. Registration data history and other information data is stored in the RDH 260. In one embodiment, the DCMS 250 may be running within an operating system, e.g., a system service, daemon, etc. In another embodiment, the DCMS 250 may be integrated an operating system kernel.

Figure 3:
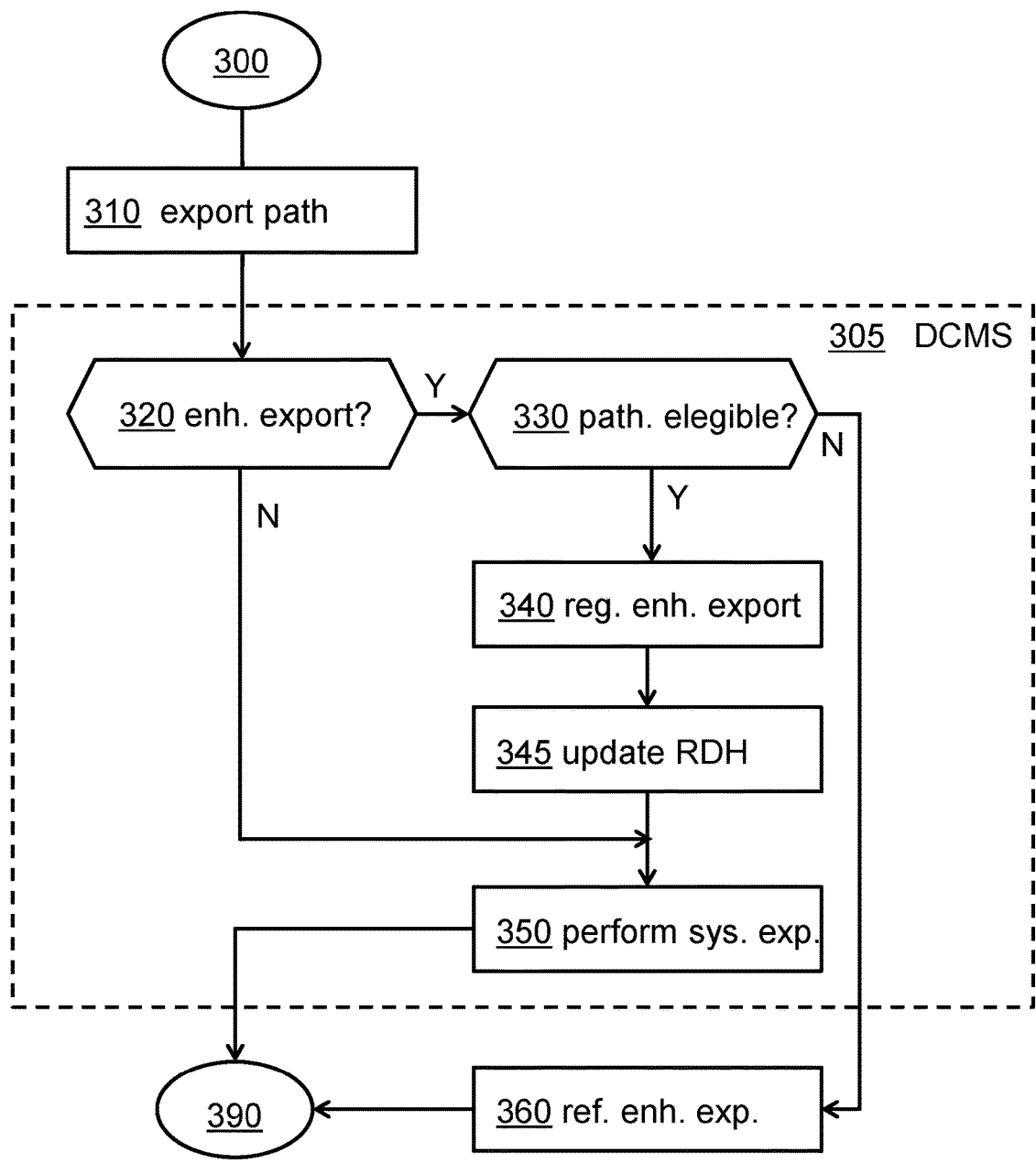
FIG. 3 shows a flow diagram of an enhanced export process.

FIG. 3 shows a flow diagram of an enhanced export process. The flow diagram starts with 300. The DCMS 305 receives an export request for a path, 310, and determines, 320, if the corresponding export is a standard system export or an enhanced export. If said export is requested as a standard system export, a standard system export is performed 350 and the process stops, 390. Otherwise, the DCMS 305 checks, 330, if said path is eligible for an enhanced export 330, e.g., path itself is mounted from a storage device. In case that said path is not eligible, the DCMS 305 refuses, 360, that request for an enhanced export and the process stops, 390. Otherwise said export is registered as an enhanced export 340 and updates, 345, the RDH, e.g. stores the storage device data associated to that path, export date/time initiator, etc. Next, the DCMS 305 performs a standard system export 350 and the process stops, 390.

Figure 4:
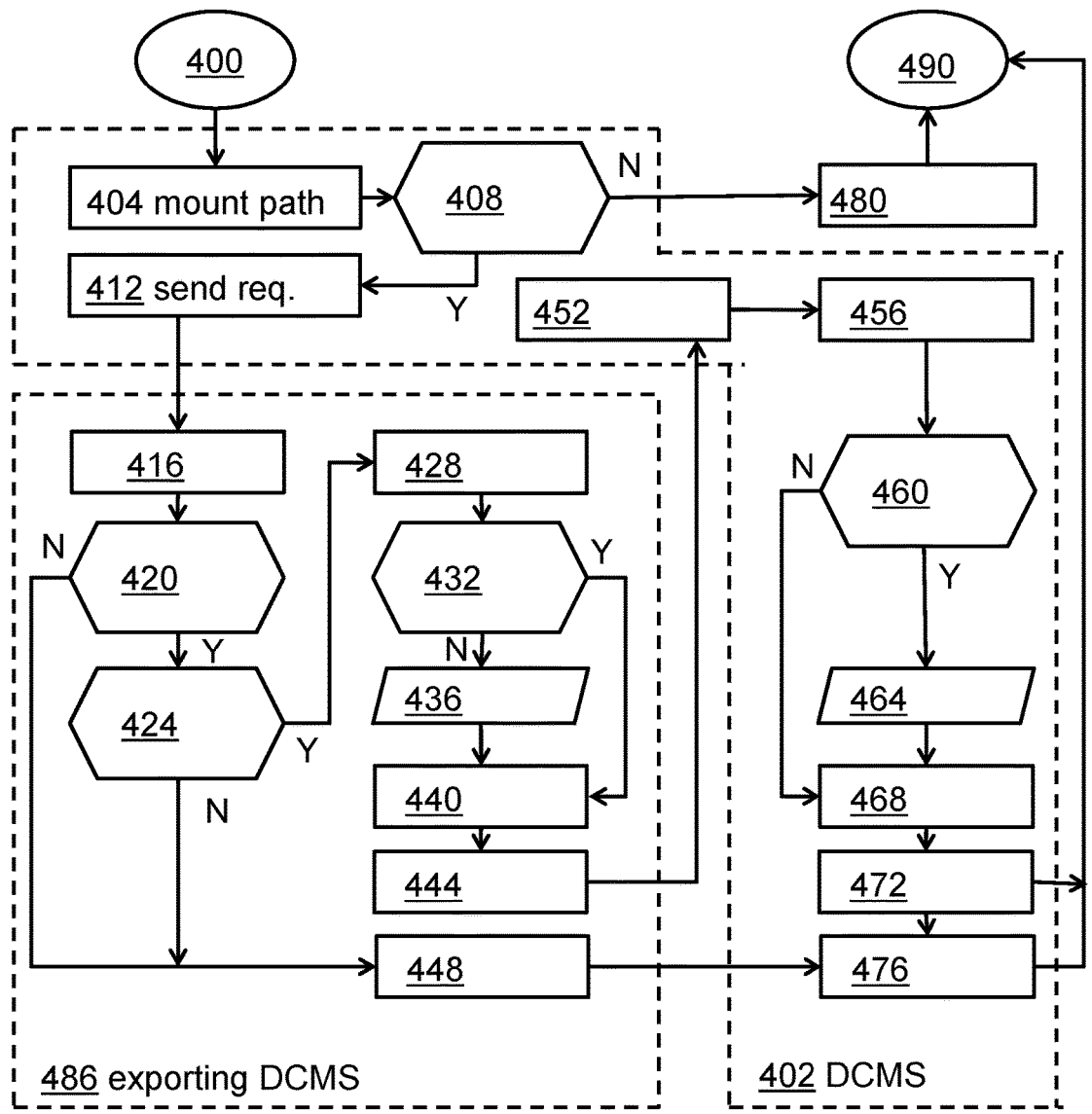
FIG. 4 shows a block diagram of an embodiment of an enhanced mount process.
Figure 8:
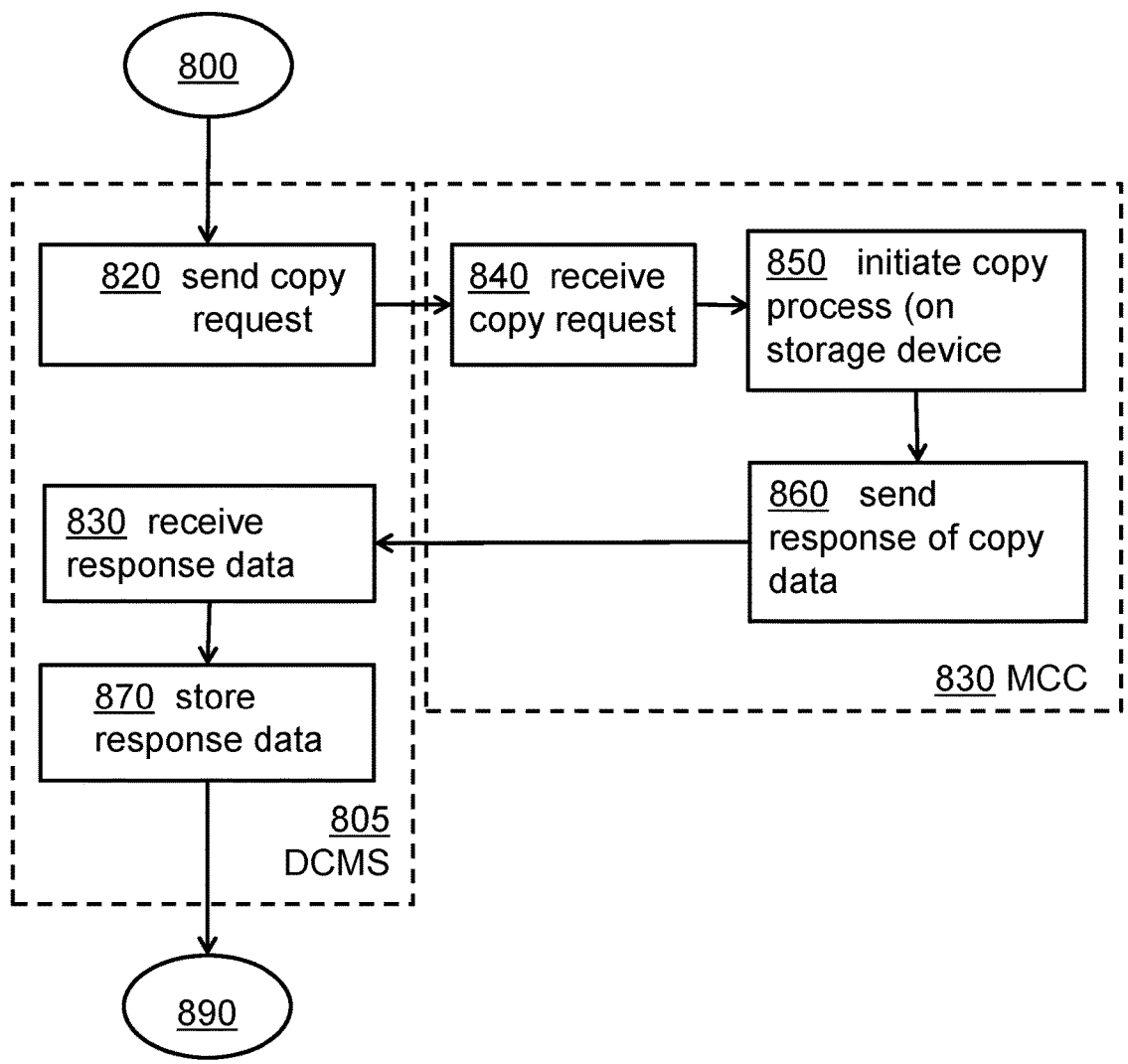
FIG. 8 shows a flow diagram of the copying an associated disk process.

FIG. 4 shows a block diagram of an embodiment of an enhanced mount process. The flow diagram starts with 400. The DCMS 402 receives a mount request for a path, 404, and determines if the mount request is an enhanced mount or a standard system mount, 408. If the request is a standard system mount request, a standard system mount is performed, 480, and the process stops at 490. Otherwise, the DCMS 402 sends an enhanced mount request, 412, to the exporting DCMS 486. The exporting DCMS 486 receives the request, 416, and checks if the requested path is registered as an enhanced export request, 420. If the path is registered, the exporting DCMS 486 checks in the next step 424 if the server of the DCMS 402 is eligible. If the server is eligible, the exporting DCMS 486 gets the registration data of the enhanced export, 428. In step 432, the exporting DCMS 486 checks if a deferred copy mode is requested. If a deferred copy process may be requested, the process continuous with step 440. Otherwise, the exporting DCMS 486 triggers, 436, the copy of the associated disk, which is depicted in FIG. 8, and continuous with step 440. In step 440 the RDH (of DCMS 486) is updated, e.g. storing data of DCMS 402 (like server, requested path, requested copy mode, date/time). Next, the exporting DCMS 486 sends, 444, the enhanced mount data to the DCMS 402. The DCMS 402 receives, 452, the enhanced mount data and stores the data 456. In the next step, the DCMS 402 decides, 460, if a deferred copy was requested. In case of a deferred copy, the DCMS 402 triggers, 464, the copy of the associated disk, which is depicted in FIG. 8, and continuous with step 468. Otherwise, step 460 continuous with step 468, in which the DCMS 402 performs a system mount using obtained mount data. After updating, 472, the RDH (of DCMS 402), the process stops, 490. In case that in step 420 the requested path is not registered as an enhanced export in the exporting DCMS 486 or, in case that in step 424 the server is not eligible, the exporting DCMS 486 refuses, 448, the request. The refusal is received by the DCMS 402 in step 476 and the process stops, 490.

Figure 5:
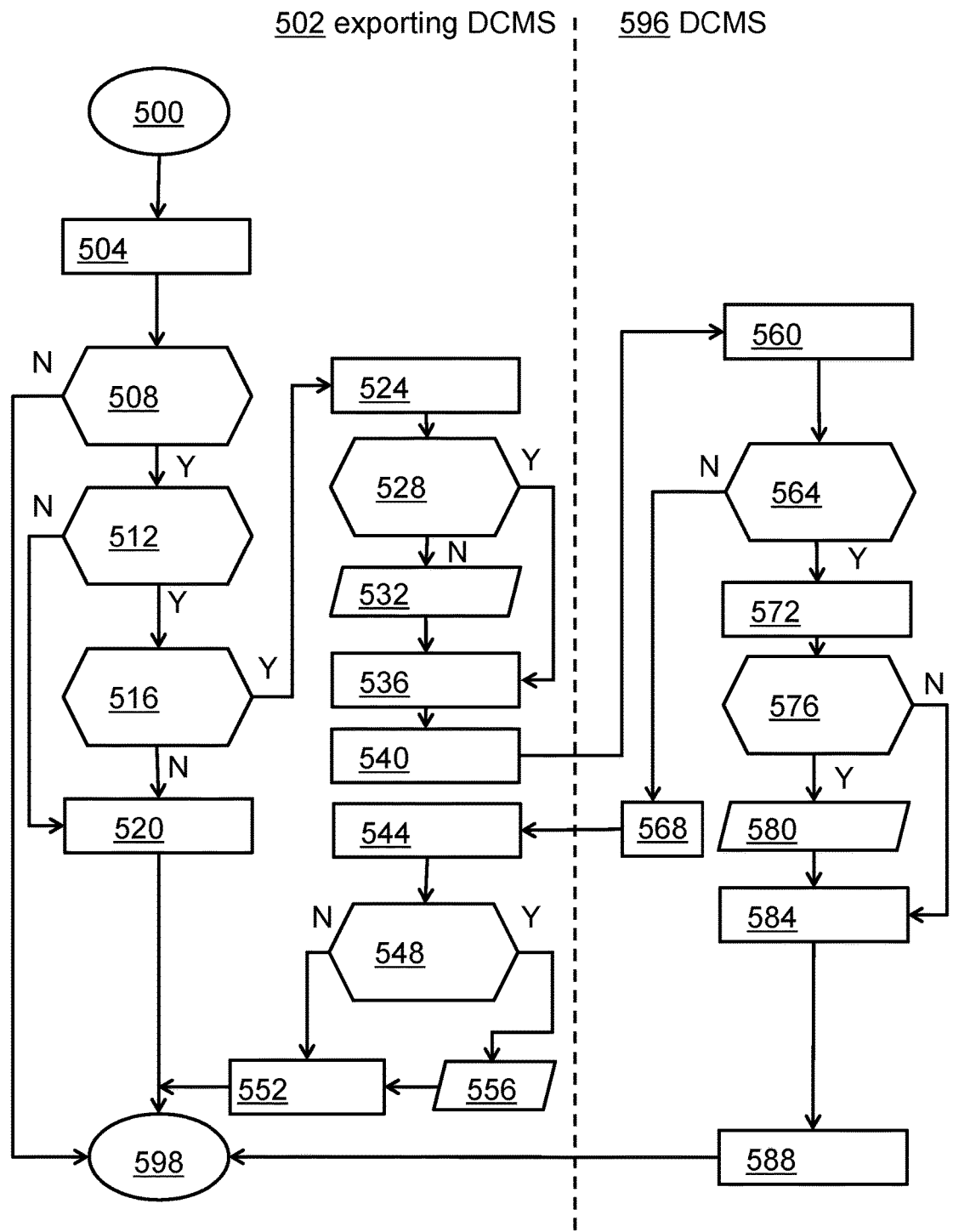
FIG. 5 shows a flow diagram of an enhanced remote mount.

FIG. 5 shows a flow diagram of an enhanced remote mount process. The flow diagram starts at 500. The exporting DCMS 502 receives a mount request for a path, 504, and determines if the mount request is an enhanced remote mount, 508. If the request is not an enhanced remote mount, the process stops, 598. Otherwise, the exporting DCMS 502 checks if the requested path is registered as an enhanced export, 512. If the path is registered, the exporting DCMS 502 checks in the next step 516 if the target server of the request is eligible. If the target server is eligible, the exporting DCMS 502 gets the registration data of the enhanced export 524. In step 528, the exporting DCMS checks if a deferred copy mode is requested. If a deferred copy process is requested, the process continuous with step 536. Otherwise, the exporting DCMS 502 triggers the copy of the associated disk, 532, which is depicted in FIG. 8, and continuous with step 536. In step 536, the RDH (of DCMS 502) is updated, e.g., storing the requested data (like target server, requested path, requested copy mode, initiator, date/time). Next, the exporting DCMS 502 sends the enhanced remote mount request (including enhanced remote mount data), 540 to DCMS 596. DCMS 596 receives the enhanced remote mount request 560. In the next step 564, the DCMS 596 decides, if the enhanced remote mount request is eligible, e.g., remote mount is enabled, remote mount initiator is accepted. If the enhanced remote mount request is eligible, received enhance remote mount data is stored 572. In the next step 576, the DCMS 596 decides if a deferred copy was requested. In case of a deferred copy, the DCMS 596 triggers, 580, the copy of the associated disk, which is depicted in FIG. 8, and continuous with step 584. Otherwise, step 576 continuous with step 584. In step 584, the DCMS 596 performs a system mount using obtained mount data. After updating, 588, the RDH (of DCMS 596), the process stops, 598.

Figure 9:
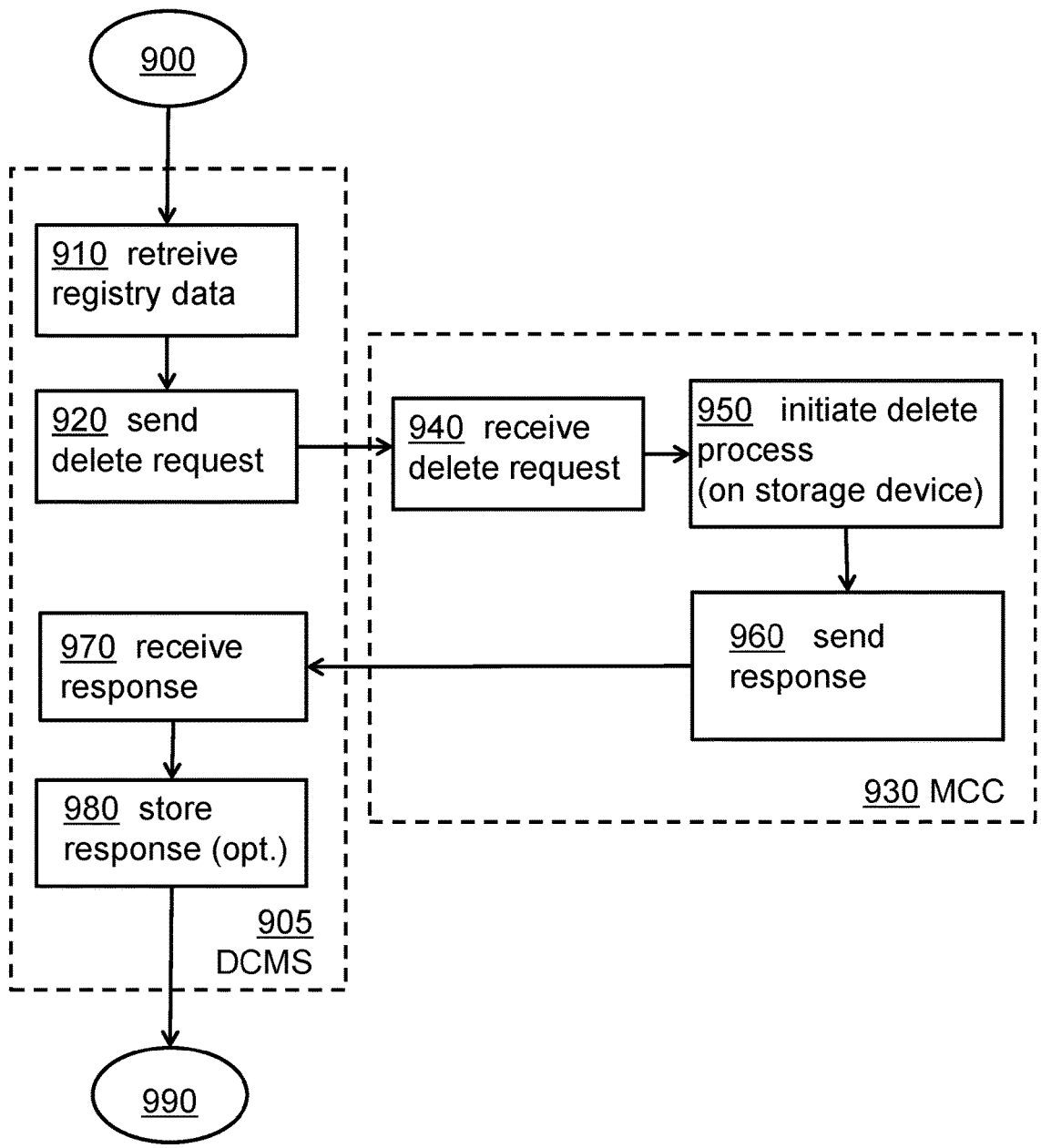
FIG. 9 shows a flow diagram of the deletion of an associated disk process.

In case that in step 564 the enhanced remote mount request is not eligible, the DCMS 596 refuses, 568, the request. The refusal is received by exporting DCMS 502 in step 544. In the next step 548, the exporting DCMS 502 checks if deferred copy process was requested. If no deferred copy process was requested, the process flow continuous with step 552. Otherwise, the exporting DCMS 502 triggers the deletion of the copied disk according the enhanced remote mount data 556, which is depicted in FIG. 9, and continuous with step 552. In step 552, the RDH (of DCMS 502) is updated, e.g., storing refusal information, and the process stops, 598. In case that in step 512 the requested path is not registered as an enhanced export in exporting DCMS 502 or in case that in step 516, the target server is not eligible, the exporting DCMS 502 refuses, 520, the request and the process stops, 598.

Figure 6:
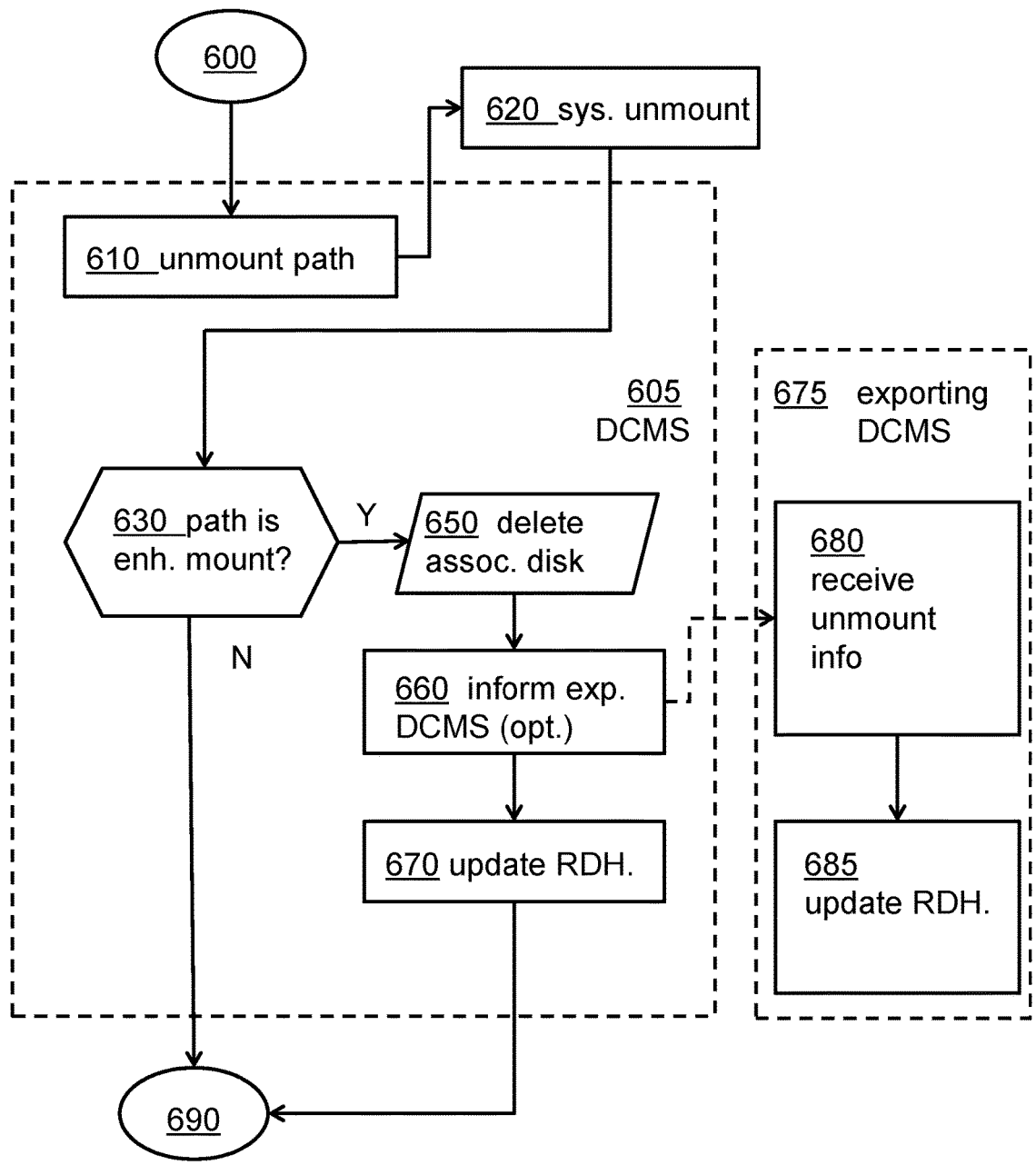
FIG. 6 shows a flow diagram of an enhanced unmount process.

FIG. 6 shows a flow diagram of an enhanced unmount process. The flow diagram starts with 600. DCMS 605 receives an unmount request for a path, 610, and performs a system unmount of the path at block 620. In step 630, the DCMS 605 checks if the path is from an enhanced mount. If the mount is not from an enhanced mount, then the process stops, 690. Otherwise, the DCMS 605 triggers, 650, the deletion of the associated disk, which is depicted in FIG. 9. In an optional step 660, the DCSM 605 informs the exporting DCMS 675, from where the path was exported during the enhanced mount process. In the next step, DCMS 605 updates, 670, its RDH, e.g., stores deletion time, if the source DCMS was informed, etc., and the process stops, 690. In case that in step 660 the exporting DCMS 675 is informed, the DCMS 675 receives, 680, the unmount information and updates, 685, its own RDH.

Figure 7:
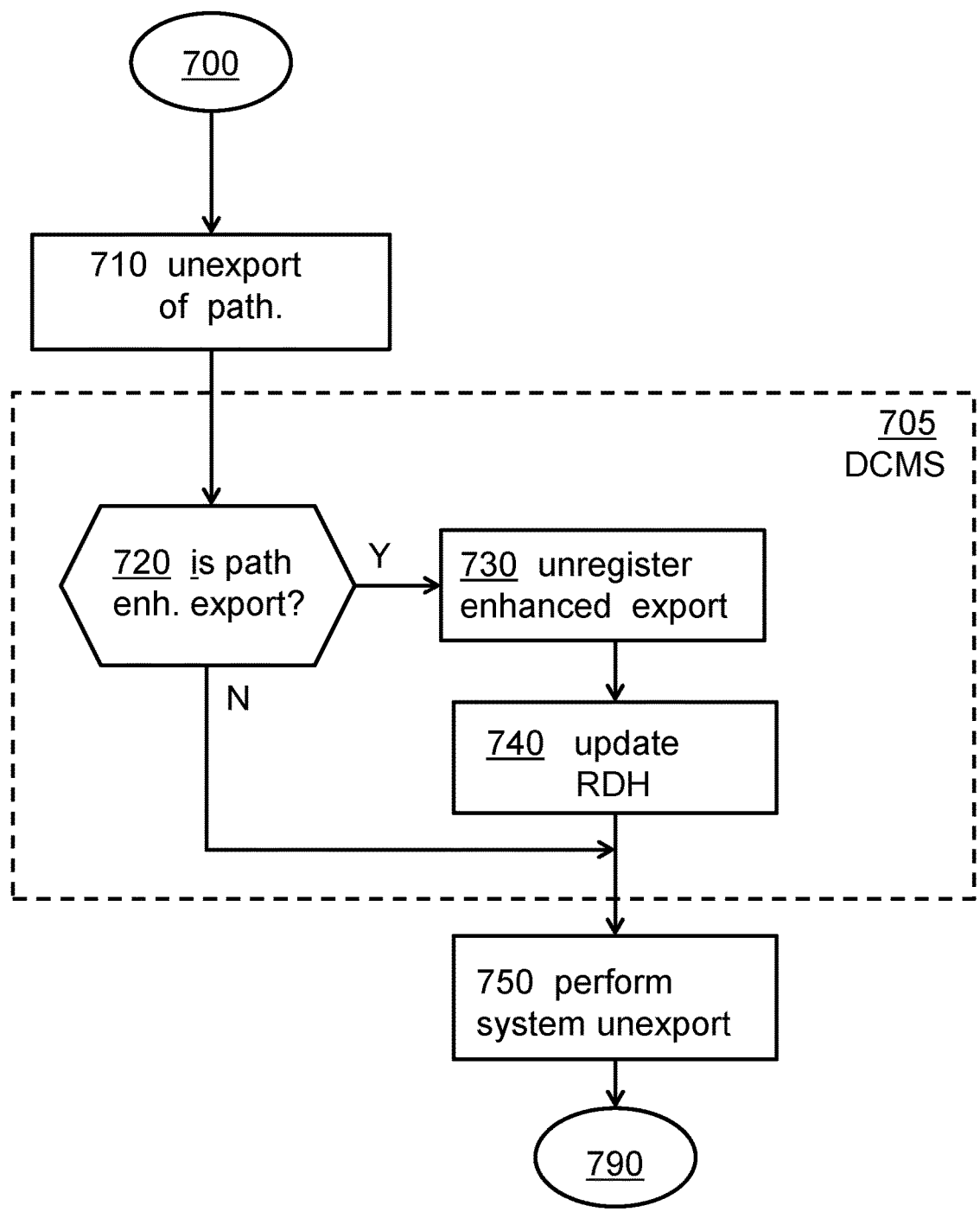
FIG. 7 shows a flow diagram of an enhanced unexport process.

FIG. 7 shows a flow diagram of an enhanced unexport process. The flow diagram starts at 700. DCMS 705 receives an unexport request for a path, 710, and determines, 720, if the associated export is a standard system export or an enhanced export. If said export request refers to a standard system export, a standard system unexport process is performed, 750, and the process stops,

790. Otherwise, the DCMS 705 unregisters 730, said enhanced export and updates, 740, the RDH, e.g., saves date/time, initiator, etc. In the next step 750, the DCMS 705 performs a standard system unexport 750, and the process stops, 790.

FIG. 8 shows a flow diagram of the copy associated disk task. The flow diagram starts with 800. DCMS 805 creates a copy request, e.g., on which volume/disk that path resists, execution model synchronous/asynchronous, etc., and sends, 820, the request to the MCC 830 on the storage device. The MCC 830 receives, 840, the copy request and starts all corresponding storage operations 850 according to the requested data, e.g., create volumes, initiate flash-copy, mapping, etc.

In the next step, the MCC 830 creates a response to the request, e.g., storage metadata of the copy, and sends, 860, the response to the DCMS 805. DCMS 805 receives, 830, the response data, stores, 870, the data and the process stops, 890.

FIG. 9 shows a flow diagram of the deletion associated disk task. The flow diagram starts with 900. The DCMS 905 retrieves, 910, the registered data of the path. The DCMS 905 creates a delete request, e.g., on which volume/disk that path resists, execution model synchronous/asynchronous, secure delete mode, etc., and sends, 920, the request to MCC 930 on the storage device. The MCC 930 receives, 940, the delete request and starts, 950, all corresponding storage operation according to the request data, e.g., overwriting data (secure deletion), delete volume, unmapping, etc. In the next step, the MCC 930 creates a response to the request, e.g., execution state, and sends 960, the response to the DCMS 905. DCMS 905 receives, 970, the response, optionally stores, 980, the response and the process stops, 990.

Figure 10:
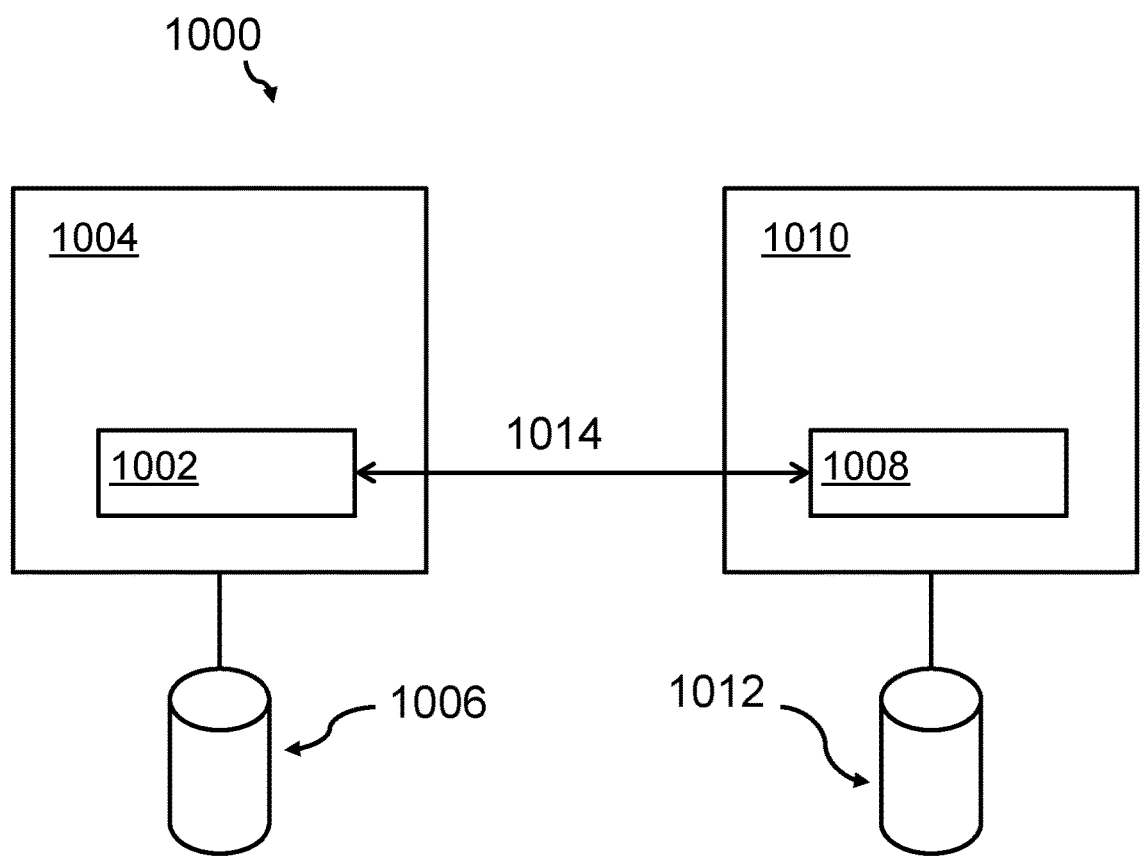
FIG. 10 shows a block diagram of an embodiment of the inventive system for smart mounting of a storage device to a server.

FIG. 10 shows a block diagram of an embodiment of the inventive system 1000 for smart mounting of a storage device to a server. A system 1000 comprises a first peer-to-peer communication component 1002 of a first server 1004 a first storage device 1006 is controlled by, and a second peer-to-peer communication component 1008 of a second server 1010 a second storage device 1012 is controlled by. The second peer-to-peer communication component 1008 is adapted for requesting, by the second server 1010, a mounting of the first storage device 1006 of the first server 1004 using a direct communication 1014 between the first peer-to-peer communication component 1002, and the second peer-to-peer communication component 1008 using a peer-to-peer communication protocol between the first and the second peer-to-peer communication component 1002, 1008, respectively, without using a central instance between the first and the second server 1004, 1010, respectively. The first peer-to-peer-communication component 1002 is adapted for providing mounting information of the first storage device 1006 to the second peer-to-peer communication component 1008 without using the central instance.

Figure 11:
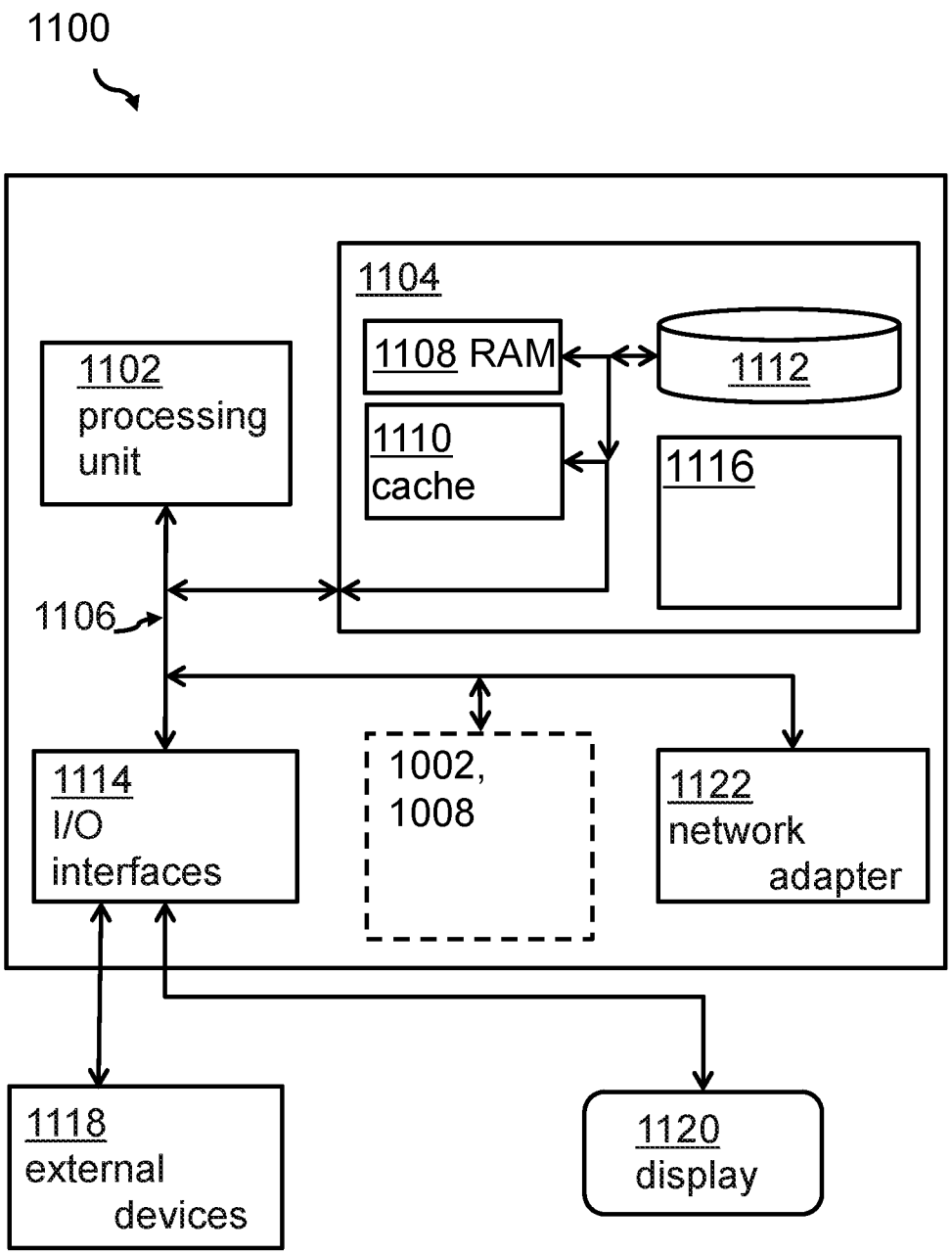
FIG. 11 shows a computing system to be used in the context of the inventive concept.

Embodiments of the invention may be implemented together with virtually any type of computer, regardless of the platform being suitable for storing and/or executing program code. FIG. 11 shows, as an example, a computing system 1100 suitable for executing program code related to the proposed method.

The computing system 1100 is only one example of a suitable computer system and is not intended to suggest any limitation as to the scope of use or functionality of embodiments of the invention described herein. Regardless, computer system 1100 is capable of being implemented and/or performing any of the functionality set forth hereinabove. In the computer system 1100, there are components, which are operational with numerous other general purpose or special purpose computing system environments or configurations. Examples of well-known computing systems, environments, and/or configurations that may be suitable for use with computer system/server 1100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 1100 may be described in the general context of computer system-executable instructions, such as program modules, being executed by a computer system 1100. Generally, program modules may include routines, programs, objects, components, logic, data structures, and so on that perform particular tasks or implement particular abstract data types. Computer system/server 1100 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 1100 is shown in the form of a general-purpose computing device. The components of computer system/server 1100 may include, but are not limited to, one or more processors or processing units 1102, a system memory 1104, and a bus 1106 that couples various system components including system memory 1104 to the processor 1102. Bus 1106 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1100 typically includes a variety of computer system readable media. Such media may be any available media that is accessible by computer system/server 1100, and it includes both, volatile and non-volatile media, removable and non-removable media.

The system memory 1104 may include computer system readable media in the form of volatile memory, such as random access memory (RAM) 1108 and/or cache memory 1110. Computer system/server 1100 may further include other removable/non-removable, volatile/non-volatile computer system storage media. By way of example only, storage system 1112 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 1106 by one or more data media interfaces. As will be further depicted and described below, memory 1104 may include at least one program product having a set (e.g., at least one) of program modules that are configured to carry out the functions of embodiments of the invention.

Program/utility 1114, having a set (at least one) of program modules 1116, may be stored in memory 1104 by way of example, and not limitation, as well as an operating system, one or more application programs, other program modules, and program data. Each of the operating system, one or more application programs, other program modules, and program data or some combination thereof, may include an implementation of a networking environment. Program modules 1116 generally carry out the functions and/or methodologies of embodiments of the invention as described herein.

The computer system/server 1100 may also communicate with one or more external devices 1118 such as a keyboard, a pointing device, a display 1120, etc.; one or more devices that enable a user to interact with computer system/server 1100; and/or any devices (e.g., network card, modem, etc.) that enable computer system/server 1100 to communicate with one or more other computing devices. Such communication can occur via Input/Output (I/O) interfaces 1114. Still yet, computer system/server 1100 may communicate with one or more networks such as a local area network (LAN), a general wide area network (WAN), and/or a public network (e.g., the Internet) via network adapter 1122. As depicted, network adapter 1122 may communicate with the other components of computer system/server 1100 via bus 1106. It should be understood that although not shown, other hardware and/or software components could be used in conjunction with computer system/server 1100. Examples, include, but are not limited to: microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Additionally, the first and/or second peer-to-peer communication component 1002, 1008 may be connected to the bus system 512.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for smart mounting of a storage device to a server, said method comprising:
   providing a first peer-to-peer communication component to a first server a first storage device is controlled by,
   providing a second peer-to-peer communication component to a second server a second storage device is controlled by,
   requesting by said second server a mounting of said first storage device of said first server using a direct communication between said first peer-to-peer communication component and said second peer-to-peer communication component using a peer-to-peer communication protocol between said first and said second peer-to-peer communication component without using a central instance between said first and said second server, and
   providing mounting information of said first storage device to said second peer-to-peer communication component without using said central instance.

2. The method according to claim 1, also comprising initiating a copying request by said first or said second server and starting said copying process at least at one of said first or said second storage device using only said first peer-to-peer communication component and said second peer-to-peer communication component.

3. The method according to claim 1, wherein said first storage device and said second storage device is each connected to a joint storage area network.

4. The method according to claim 1, wherein said first storage device and said second storage device is each part of said same storage system.

5. The method according to claim 1, wherein said first storage device and said second storage device is each part of a different storage system using said joint storage area network.

6. The method according to claim 1, wherein a registry data history is shared among said first and second peer-to-peer communication component for cross-accessing storage devices without ad-hoc conversions, and wherein registry data history information of a storage device is maintained individually per peer-to-peer communication component.

7. The method according to claim 1, wherein, prior to a mounting of a storage device not controlled by a server, said server related peer-to-peer communication component determines whether said server controlling said second storage device is equipped with a peer-to-peer communication component.

8. The method according to claim 1, wherein a communication between said first and said second peer-to-peer communication component is using a communication technology based on a protocol of said storage area network.

9. The method according to claim 1, wherein the peer-to-peer communication protocol is configured to provide direct communication between the first and second peer-to-peer communication components.

10. The method according to claim 1, wherein registration data history information of a plurality of storage devices is maintained jointly in one joint archive.

11. A system for smart mounting of a storage device to a server, said system comprising
   a first peer-to-peer communication component of a first server a first storage device is controlled by,
   a second peer-to-peer communication component of a second server a second storage device is controlled by,
      wherein said second peer-to-peer communication component is adapted for requesting, by said second server, a mounting of said first storage device of said first server using a direct communication between said first peer-to-peer communication component and said second peer-to-peer communication component using a peer-to-peer communication protocol between said first and said second peer-to-peer communication component without using a central instance between said first and said second server, and
      wherein said first peer-to-peer-communication component is adapted for directly providing mounting information of said first storage device to said second peer-to-peer communication component without using said central instance.

12. The system according to claim 11, also comprising a copy initiating unit adapted for initiating a copying request for a file system by said first or said second server and starting said copying process for the file system at least at one storage system using only said first peer-to-peer communication component and said second peer-to-peer communication component.

13. The system according to claim 11, wherein said first storage device and said second storage device is each connected to a same storage area network.

14. The system according to claim 11, wherein said first storage device and said second storage device is each part of said same storage system.

15. The system according to claim 11, wherein said first storage device and said second storage device is each part of a different storage system using a joint storage area network.

16. The system according to claim 11, wherein said first and second peer-to-peer communication components are adapted for maintaining a registry data history.

17. The system according to claim 11, also comprising a determination unit adapted for, prior to a mounting of a storage device not controlled by a server, said server related peer-to-peer communication component determining whether said server controlling said second storage device is equipped with a peer-to-peer communication component.

18. The system according to claim 11, wherein a communication between said first and said second peer-to-peer communication component is based on a communications technology, based on a protocol of said storage area network.

19. The system according to claim 11, wherein registration data history information of a storage device is maintained individually per peer-to-peer communication component, or wherein registration data history information of a plurality of storage devices is maintained jointly in one joint archive.

20. A computer program product for smart mounting of a storage device to a server, said computer program product comprising a computer readable storage medium having program instructions embodied therewith, said program instructions being executable by one or more computing systems to cause said one or more computing systems to
- provide a first peer-to-peer communication component to a first server a storage device is controlled by,
- provide a second peer-to-peer communication component to a second server a second storage device is controlled by,
- request by said second server a mounting of said first storage device of said first server using a direct communication between said first peer-to-peer communication component, and said second peer-to-peer communication component using a peer-to-peer communication protocol between said first and said second peer-to-peer communication component without using a central instance between said first and said second server, and
- provide mounting information of said first storage device directly to said second peer-to-peer communication component without using said central instance.

* * * * *